US006073951A

United States Patent [19]

Jindra et al.

[11] Patent Number: 6,073,951

[45] Date of Patent: Jun. 13, 2000

[54] ARTICULATING SEAT/CHASSIS INTERFACE FOR A WHEELCHAIR

[75] Inventors: John Jindra, Elyria; Roland A. Mentessi, North Royalton, both of Ohio; Jason Hunt, Ann Arbor, Mich.

[73] Assignee: Invacare Corporation, Elyria, Ohio

[21] Appl. No.: 09/163,782

[22] Filed: Sep. 30, 1998

Related U.S. Application Data

[60] Provisional application No. 60/060,952, Oct. 6, 1997.

[51] Int. Cl.[7] .......... B62H 1/00

[52] U.S. Cl. .......... 280/304.1; 280/250.1; 280/788; 297/300.1; 297/130; 180/907

[58] Field of Search .......... 280/788, 250.1, 280/304.1; 297/300.1, 130; 403/161, 163; 24/573.1, 573.7, 573.2; 180/907

[56] References Cited

U.S. PATENT DOCUMENTS

| | | | |
|---|---|---|---|
| 2,568,261 | 9/1951 | Stade . | |
| 3,791,096 | 2/1974 | Epperlein | 24/573.2 X |
| 3,917,312 | 11/1975 | Rodaway | 297/130 X |
| 3,976,152 | 8/1976 | Bell . | |
| 4,362,311 | 12/1982 | Bergman | 297/130 X |
| 4,671,528 | 6/1987 | Thompson | 24/573.1 X |
| 4,966,392 | 10/1990 | Featon et al. | 280/304.1 X |
| 5,004,259 | 4/1991 | Ayers et al. . | |
| 5,042,607 | 8/1991 | Falkenson et al. . | |
| 5,156,226 | 10/1992 | Boyer et al. . | |
| 5,556,120 | 9/1996 | Davis | 280/304.1 |
| 5,727,802 | 3/1998 | Garven, Jr. et al. . | |
| 5,782,483 | 7/1998 | Rogers et al. | 280/250.1 |
| 5,848,658 | 12/1998 | Pulver | 180/907 X |
| 5,944,131 | 8/1999 | Schaffner et al. | 180/907 X |
| 5,971,417 | 10/1999 | Swisshelm et al. | 280/304.1 |

FOREIGN PATENT DOCUMENTS

| | | |
|---|---|---|
| 2-151578 | 6/1990 | Japan . |
| 611835 | 5/1946 | United Kingdom . |
| 612287 | 11/1948 | United Kingdom . |

*Primary Examiner*—Michael Mar
*Assistant Examiner*—Toan To
*Attorney, Agent, or Firm*—Hudak & Shunk Co., L.P.A.

[57] ABSTRACT

A wheelchair includes a rigid upholstered seat removably mounted on a crossbrace-type chassis. The seat includes a generally square-shaped frame having a clevis assembly depending from each of the four corners of the frame. Each one of a first pair of the clevis assemblies disposed at diagonally opposed front and rear corners of the seat frame is formed with aligned generally pear-shaped openings. Each one of a second pair of the clevis assemblies disposed at the other diagonally opposed front and rear corners of the seat frame is formed with aligned generally horizontal elliptical-shaped openings. An inverted generally U-shaped mounting bracket formed with aligned openings is disposed on each end of each one of a pair of chassis sideframes. Each clevis assembly is engageable with a respective one of the U-shaped brackets so that the respective openings of the engaged brackets are aligned. A quick release pin is passed through each set of aligned openings to secure the seat to the chassis. The pear-shaped openings allow vertical articulation of the chassis relative to the seat in certain instances when a bump, depression or other irregularity on a travel surface is encountered by usually one of the wheels of the wheelchair. This articulation enables the wheelchair to insulate its occupant from shocks caused by such irregularities, and also maintains all wheels of the wheelchair in continuous contact with the travel surface to preserve occupant steering control and stability of the wheelchair.

13 Claims, 11 Drawing Sheets

ARTICULATING SEAT/CHASSIS INTERFACE FOR A WHEELCHAIR

This application claims benefit of Provisional Application Ser. No. 60/060,952 filed Oct. 6, 1997.

BACKGROUND OF THE INVENTION

1. Field of the Invention

The invention relates to wheelchairs, and in particular to the attachment of a seat to a chassis of a wheelchair. More particularly, the invention relates to an articulating attachment of a seat to a chassis of a wheelchair which provides for improved shock absorption, control and stability of the wheelchair.

2. Background Art

As a result of continuing population growth and improved longevity for people around the world, it follows that wheelchairs will be an increasingly integral part of society. When selecting a wheelchair, a user can consider choices ranging from very simple and inexpensive models to very complex and expensive units. As a general rule, the more feature-laden and complex a wheelchair is, the higher its cost, and thus many consumers are unable to afford features which they find desirable in a wheelchair. Therefore, one goal of many wheelchair manufacturers is to provide as many features as possible in a reliable wheelchair for the lowest possible cost.

One such feature which can add significant cost to a wheelchair is a suspension system. A suspension system, similar to that which can be found on other types of wheeled vehicles such as cars and trucks, is incorporated in a vehicle for several reasons. One reason is to absorb shocks and thereby insulate from shocks the people and/or cargo being carried by the vehicle. For example, during use of a wheelchair, small bumps or depressions on the surface on which the wheelchair is traveling can cause such shocks. Another common objective of a vehicle suspension is to maintain all of the wheels of the vehicle on the ground when such relatively small bumps or depressions are encountered, to maintain steering control and stability of the vehicle.

Such shock absorption, control and stability can be achieved in wheelchairs having sling-type seats integrated on an articulating crossbrace-type chassis, since the non-rigid nature of the sling seat facilitates articulation of that type of flexible chassis. More specifically, when one of the wheels of the wheelchair travels over a bump or a depression, the generally vertical articulation of the chassis and seat effectively absorbs the shocks caused by the irregularities in the travel surface. This articulation also maintains all of the wheels of the wheelchair in constant contact with the travel surface for reliable steering control and stability of the wheelchair. It should be noted that such articulation typically only occurs when a single wheel encounters a bump or a depression, and usually fails to occur when more than one wheel encounters such an obstacle. Moreover, such articulation is only effective in absorbing shocks and maintaining control if the bumps or depressions are relatively small.

However, many wheelchairs having crossbrace frames, which also are useful for storage and transport of the wheelchair since a crossbrace chassis folds into a compact profile, utilize upholstered captain or van-type seats which provide increased comfort for the occupant of the wheelchair. Captain or van-type seats also are considered more aesthetically pleasing than sling-type seats to many wheelchair users. Unfortunately, a drawback of such seats is that they have a rigid structure which prevents any articulation of the crossbrace-type chassis. Thus, a need exists in the art to provide an economical alternative to suspension systems for shock absorption, control and stability of crossbrace-type chassis wheelchairs having rigid van seats mounted thereon.

The present invention economically solves many of the problems of stability, control and shock absorption for wheelchairs having a crossbrace chassis with a rigid van-type seat mounted thereon, by making a simple, inexpensive and yet effective structural change which in turn changes the manner of attachment of the van seat to the chassis. More particularly, such a structural change enables articulation of the chassis relative to the seat at the interface of the chassis and seat in certain instances, when bumps, depressions or other irregularities in the travel surface of the wheelchair are encountered. Such articulation protects the occupant from shock and maintains occupant control and wheelchair stability on the travel surface.

SUMMARY OF INVENTION

Objectives of the present invention include providing an articulating seat to chassis attachment for a wheelchair which automatically absorbs and insulates the occupant of the wheelchair from shocks in certain instances when bumps, depressions or other irregularities in the travel surface are encountered by the wheelchair.

Another objective of the present invention is to provide such an articulating seat to chassis attachment for a wheelchair, in which all wheels of the wheelchair are maintained in constant contact with the travel surface in certain instances when bumps, depressions or other irregularities in the travel surface are encountered by the wheelchair, thereby maintaining occupant control and stability of the wheelchair.

A further objective of the present invention is to provide such an articulating seat to chassis attachment for a wheelchair, which is economical to manufacture and reliable in use.

These objectives and advantages are obtained by a wheelchair having a substantially rigid seat mountable on a substantially flexible chassis, the wheelchair including at least a pair of mounting brackets disposed on the chassis, the brackets each being formed with at least one opening; and at least a pair of brackets disposed on the seat, at least one of the pair of seat brackets being formed with a substantially vertically-oriented first opening, the other of the pair of seat brackets being formed with a second opening, the seat brackets each being engageable with a respective one of the chassis mounting brackets for mounting the seat on the chassis, so that upon engagement of each one of the seat brackets with a respective one of the chassis mounting brackets and alignment of the openings of the engaged brackets, a pin is insertable through the aligned openings to secure the seat to the chassis, whereby when at least a certain one of the wheels of the wheelchair engages an irregularity in a travel surface, at least one of the pins moves generally downwardly in the first opening resulting in downward articulation of the chassis relative to the seat.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
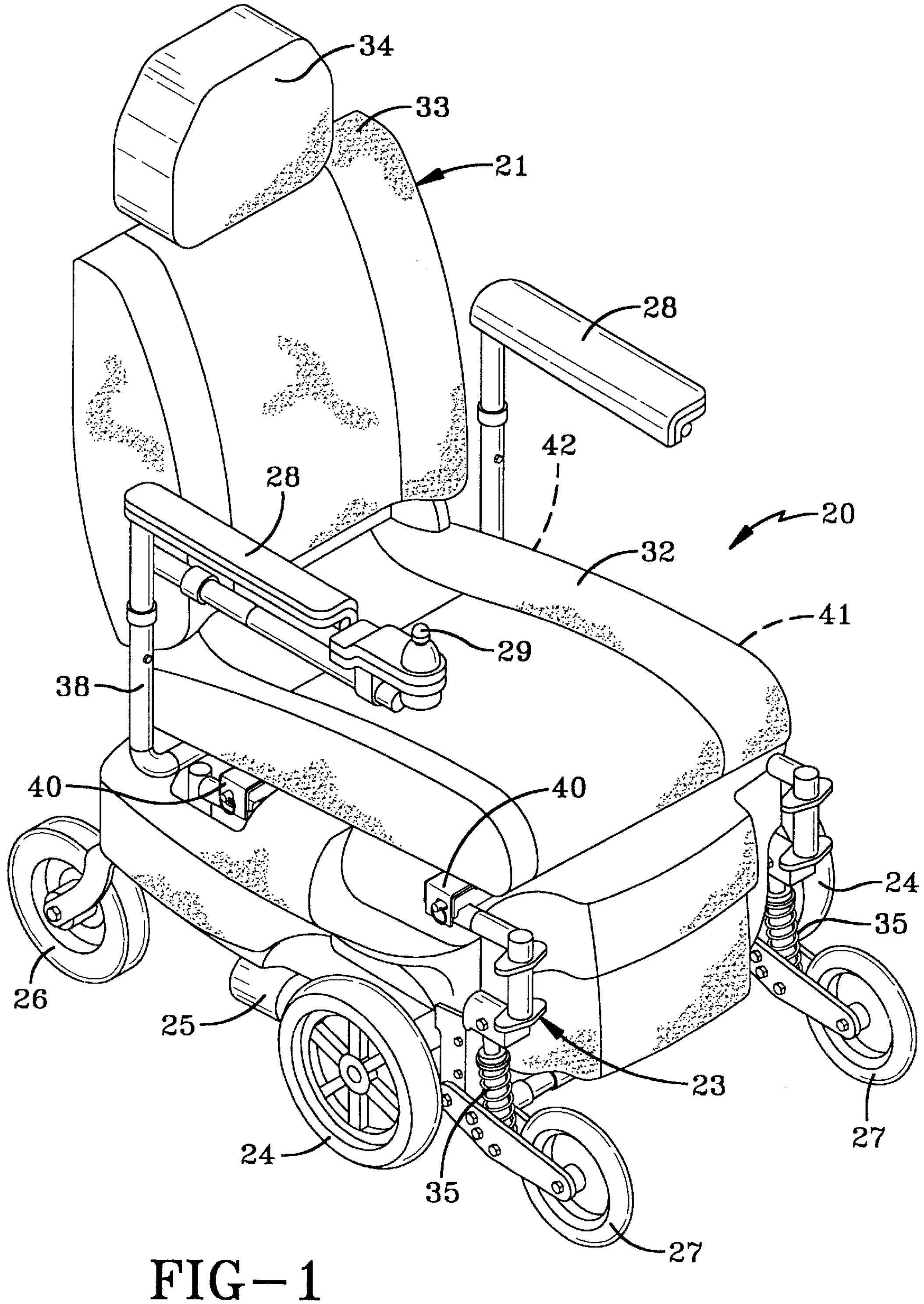
FIG. 1 is a perspective view of one type of wheelchair on which the articulating seat to chassis attachment of the present invention is incorporated.

A mid-wheel power drive wheelchair of the type on which the articulating seat to chassis interface structure of the present invention is incorporated, is indicated generally at 20 and is shown in FIG. 1. However, it is understood that the articulating seat/chassis interface of the present invention can be incorporated on any type of wheelchair, including manually driven wheelchairs and power driven wheelchairs having the drive wheels disposed other than mid or near the center of gravity of the wheelchair. Wheelchair 20 includes a rigid upholstered captain or van-type seat 21, a seat frame 22 (see FIG. 4), and a chassis 23. A pair of drive wheels 24, each of which is independently powered by a respective one of a pair of motors 25, each is mounted on chassis 23 substantially close to the center of gravity of wheelchair 20 for improved traction. However, it is apparent to those skilled in the wheelchair art that positioning of drive wheels 24 near the center of gravity of wheelchair 20 creates instability in the wheelchair and makes it more susceptible to tipping and the like. Thus, a pair of laterally spaced caster wheels 26 is mounted on the rear end of chassis 23 rearwardly of drive wheels 24, and a pair of laterally spaced stabilizer or anti-tipping wheels 27 is mounted on the front end of chassis 23 frontwardly of the drive wheels, to provide stability to the wheelchair.

Figure 2:
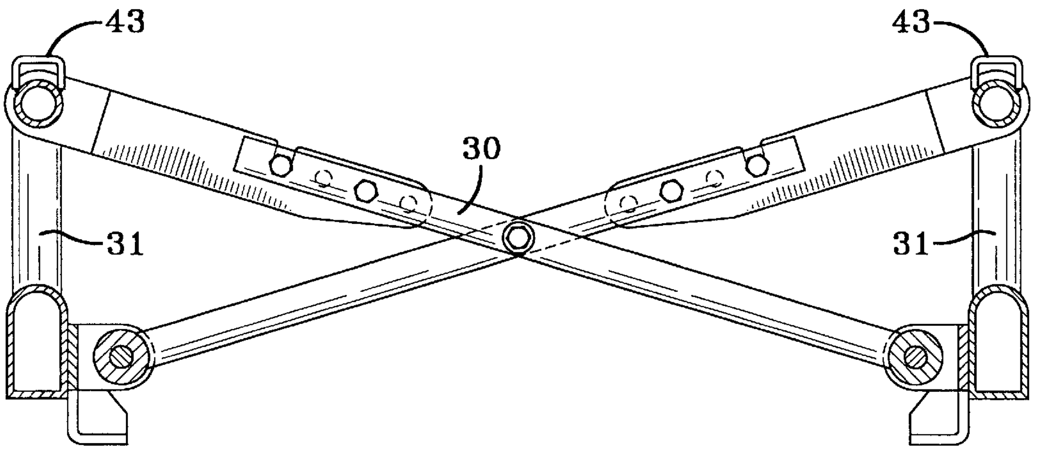
FIG. 2 is an enlarged diagrammatic front view, with portions in section and hidden parts represented by broken lines, of the crossbrace and associated structure of the wheelchair chassis of FIG. 1, shown in an open or operating position.
Figure 3:
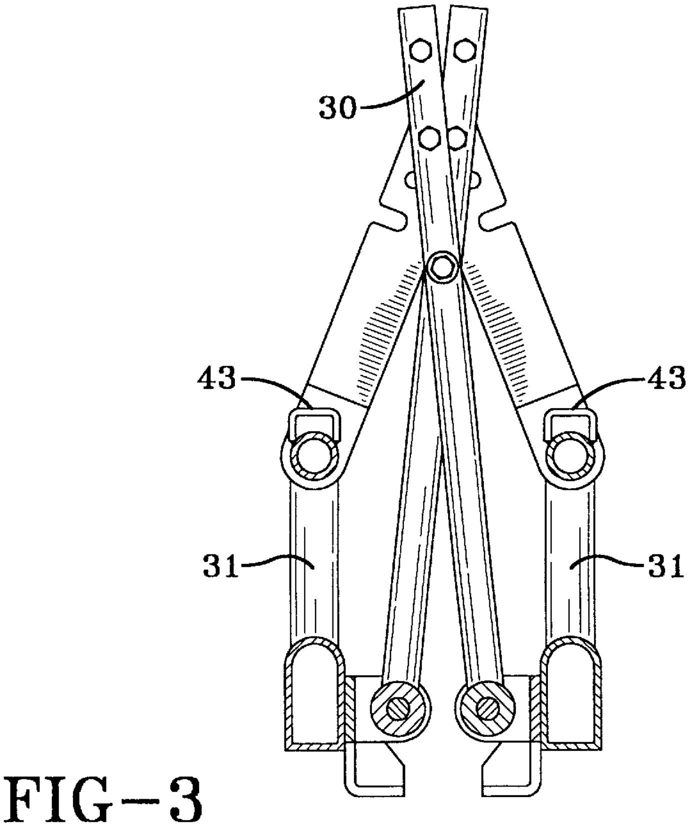
FIG. 3 is a view similar to FIG. 2, but showing the crossbrace and related structure of the chassis in a collapsed or storage/transport position.

It is understood that the articulating interface of seat frame 22 with chassis 23 has particular utility in wheelchairs having a chassis which includes a crossbrace assembly 30 (FIGS. 2 and 3). Crossbrace 30 is movable between an operational or open position, as shown in FIG. 2, wherein seat 21 and seat frame 22 can be mounted thereon, and a collapsed or storage/transport position, as shown in FIG. 3, after removal of the seat and the seat frame from chassis 23. The resulting collapsibility of chassis 23 makes it convenient for the user of wheelchair 20 to transport the wheelchair to different locations such as in a car, van or truck, or to store the wheelchair. Another advantage of a crossbrace-type chassis 23 when used in conjunction with a flexible sling-type seat (not shown) of the type well known to the art and to the literature, is that a pair of sideframes 31 (FIGS. 2, 3 and 6) of chassis 23 each is able to independently move or articulate when a depression, bump or other irregularity is encountered by usually one of wheels 24, 26, and still maintain all of the wheels in continuous contact with the surface on which wheelchair 20 is traveling. It is understood that anti-tipping wheels 27 each is disposed adjacent to but spaced from the travel surface. Each wheel 27 is biased in the direction of the travel surface by a spring 35 (FIGS. 1 and 8), and can assist in stabilizing wheelchair 20 when the wheelchair encounters certain irregularities in the travel surface or when the wheelchair travels down inclines or comes to an abrupt stop. Thus, such articulation enables wheelchair 20 to absorb shocks which insulates the occupant of the wheelchair from such shocks, and also maintains the steering control and stability of the entire wheelchair. However, sling-type seats are relatively uncomfortable and have a clinical appearance, and thus many wheelchair users prefer the more comfortable and aesthetically pleasing rigid upholstered van-type seat 21, which includes a seat bottom 32, a seat back 33 and a backrest extension 34 which is usually offered as an option. Van-type seats, however, interfere with articulation of cross-brace type chassis 23.

Turning now to seat frame 22 (FIG. 4), the seat frame includes a pair of longitudinally extending, spaced-apart parallel rails 36. The front ends of rails 36 are interconnected by a transversely extending rail 37, and the rear ends of the rails are interconnected by a transversely extending U-shaped member 38, the upwardly extending portions of which serve as mounts for a pair of arm rests 28 and a joystick control 29 (FIG. 1). Seat belt straps 39A and 39B are each attached to a rear end of a respective one of longitudinal rails 36 and are used to restrain the occupant in wheelchair 20 during its operation.

Figure 4:
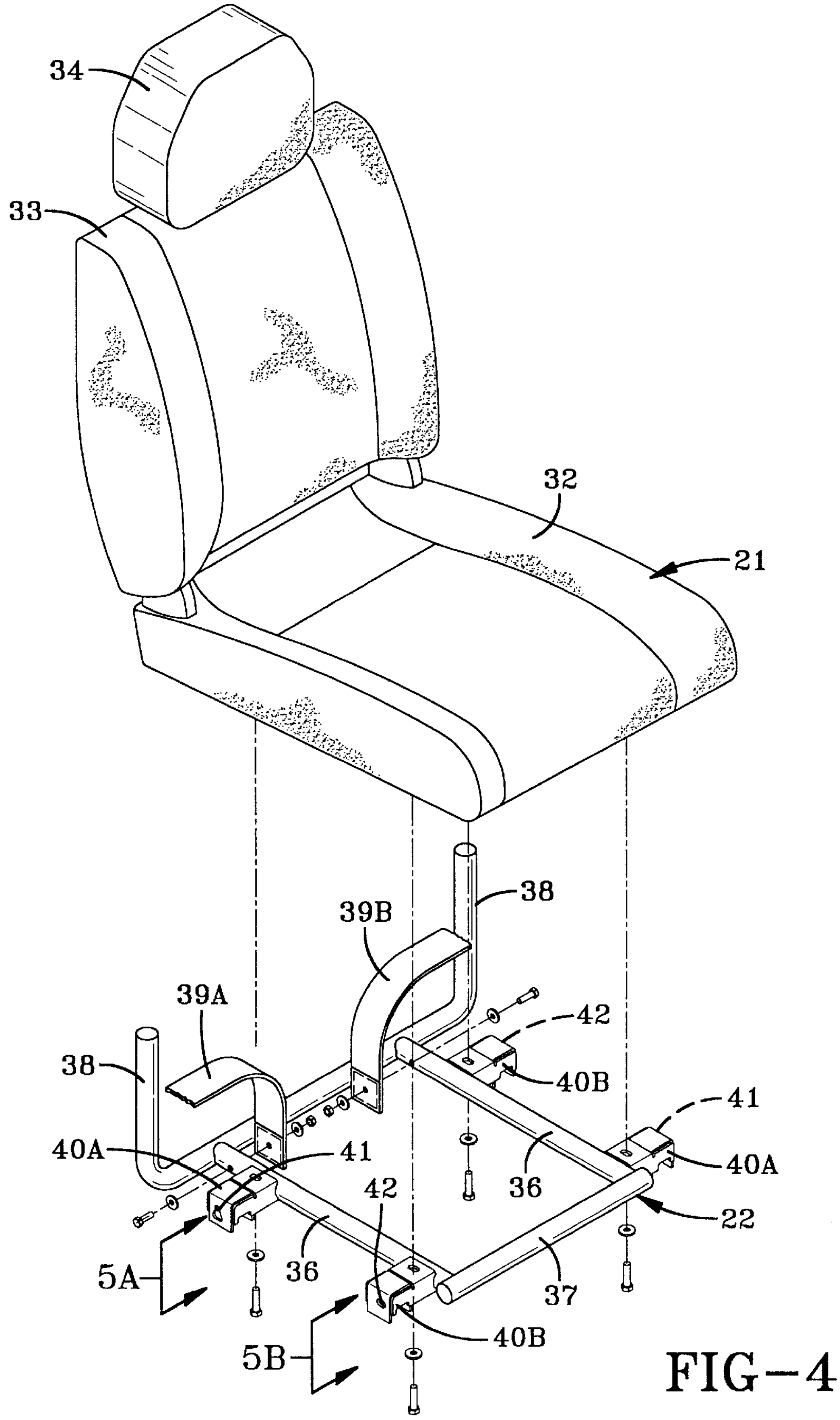
FIG. 4 is an exploded perspective view of the van seat and the seat frame of the wheelchair of FIG. 1.
Figure 5A:
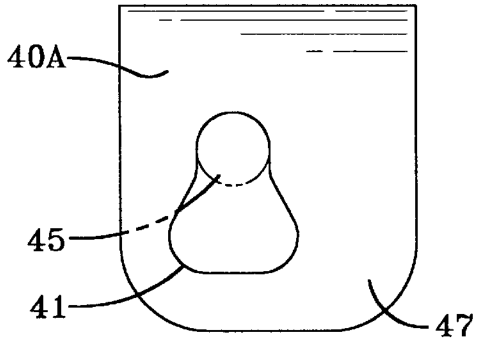
FIG. 5A is an enlarged elevational side view of one of the rear clevis assemblies of the seat frame, with a pin represented by broken lines, taken along line 5A of FIG. 4.
Figure 5B:
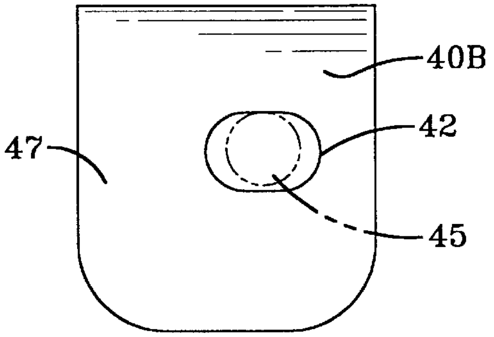
FIG. 5B is an enlarged elevational side view of one of the front clevis assemblies of the seat frame, with a pin represented by broken lines, taken along line 5B of FIG. 4.
Figure 7:
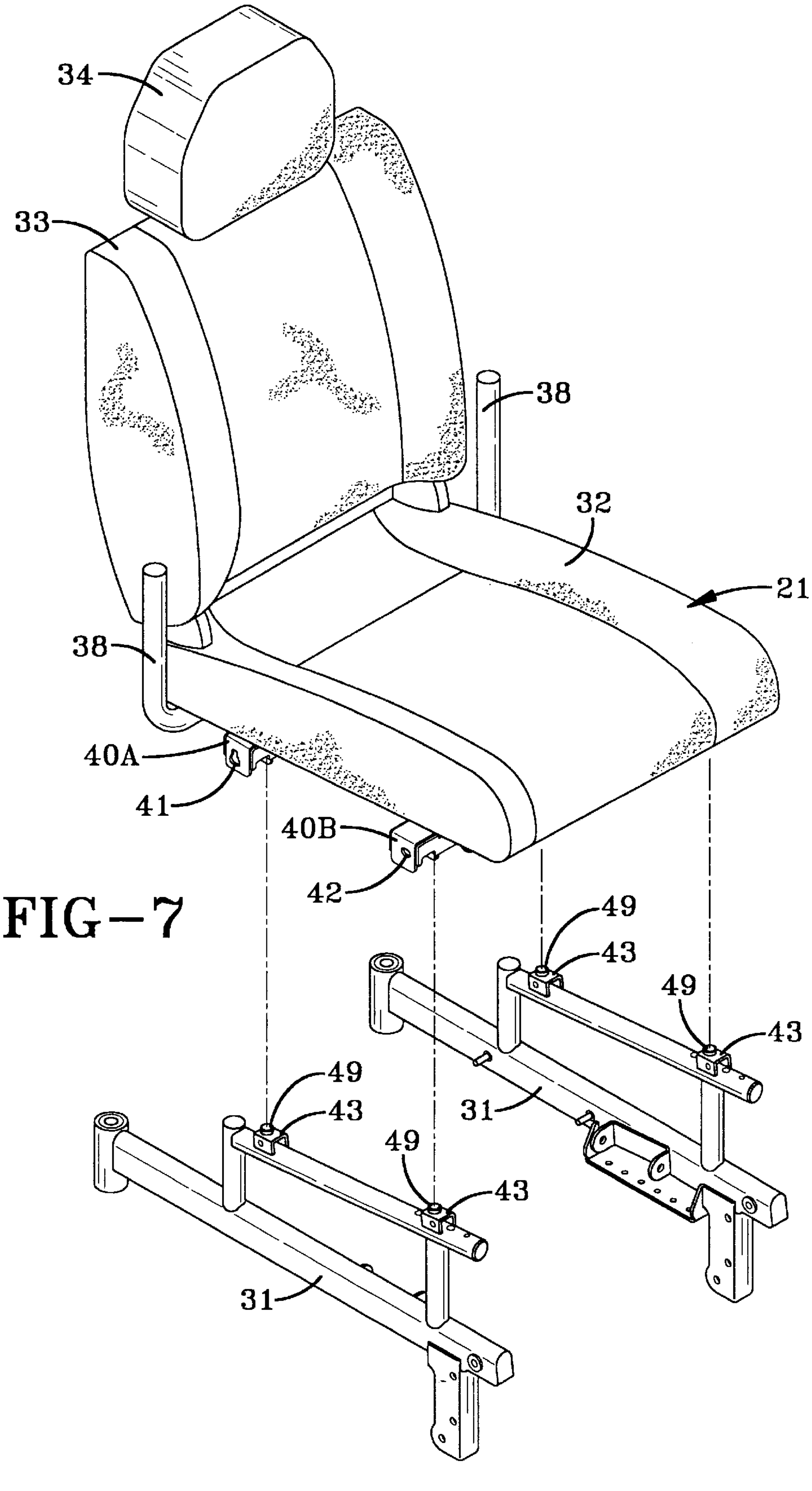
FIG. 7 is an exploded perspective view of the van seat and its associated seat frame, and the sideframes of the wheelchair chassis.
Figure 7A:
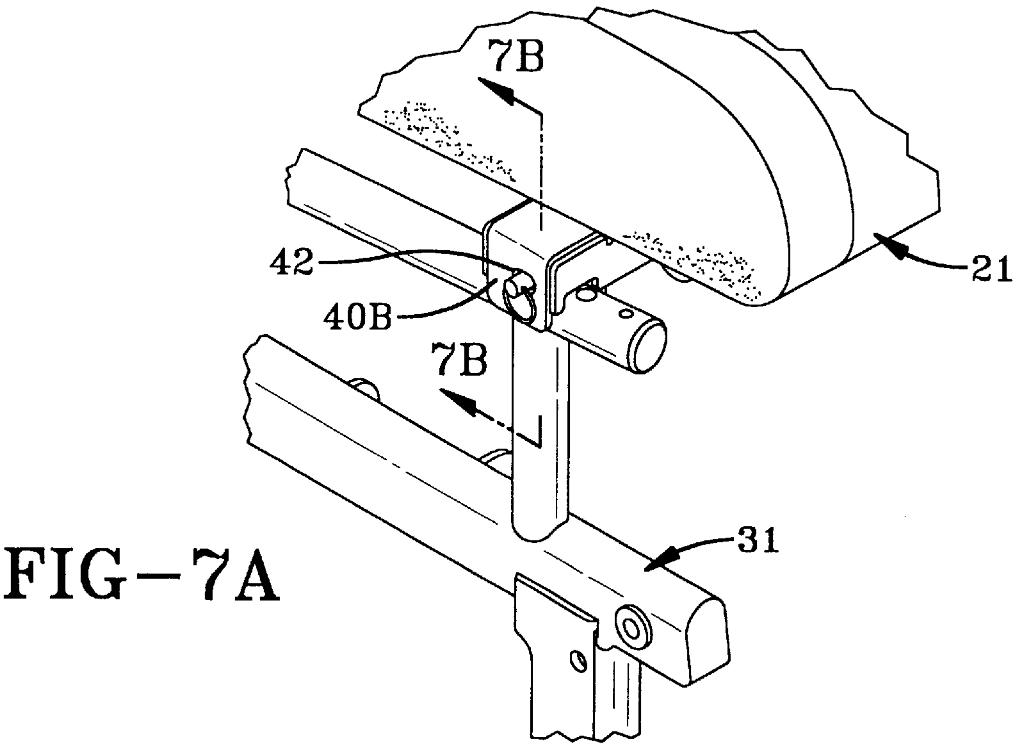
FIG. 7A is a fragmentary perspective view of one of the front corners of the van seat, seat frame and wheelchair chassis sideframes of FIG. 7, shown assembled.
Figure 7B:
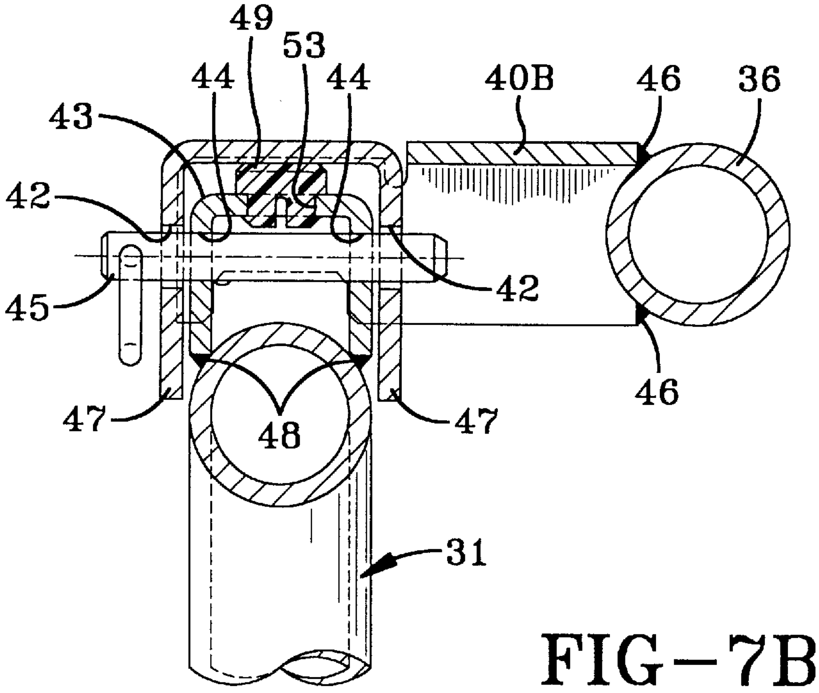
FIG. 7B is a sectional view taken along lines 7B—7B of FIG. 7A, with hidden parts represented by broken lines, particularly showing the manner in which the van seat is attached to the wheelchair chassis at each of its four corners.

In accordance with one of the key features of the present invention, a clevis assembly 40 is attached by any suitable means such as weld 46, to each one of the ends of longitudinal rails 36 adjacent to each corner of seat frame 22 as best shown in FIGS. 4 and 7B. Clevis assemblies 40 each include a pair of spaced-apart, vertically extending walls 47. One pair of clevis assemblies 40A is disposed at diagonally opposed front and rear corners of seat frame 22. Each pair of walls 47 of each clevis assembly 40A is formed with an aligned pair of generally pear-shaped openings 41 (FIG. 5A). Another pair of clevis assemblies 40B is disposed at the other diagonally opposed front and rear corners of seat frame 22, and each pair of walls 47 of each clevis assembly 40B is formed with an aligned pair of generally horizontally disposed elliptical-shaped openings 42 (FIGS. 5B and 7B). The main purpose of elliptical openings 42 is to provide for manufacturing tolerances since individual components of wheelchair 20 typically are separately manufactured and then subsequently assembled, and the play provided by openings 42 in the longitudinally extending or front-rear direction aids assembly of seat frame 22 to chassis 23. The purpose of pear-shaped openings 41 will be set forth in detail hereinbelow.

Figure 6:
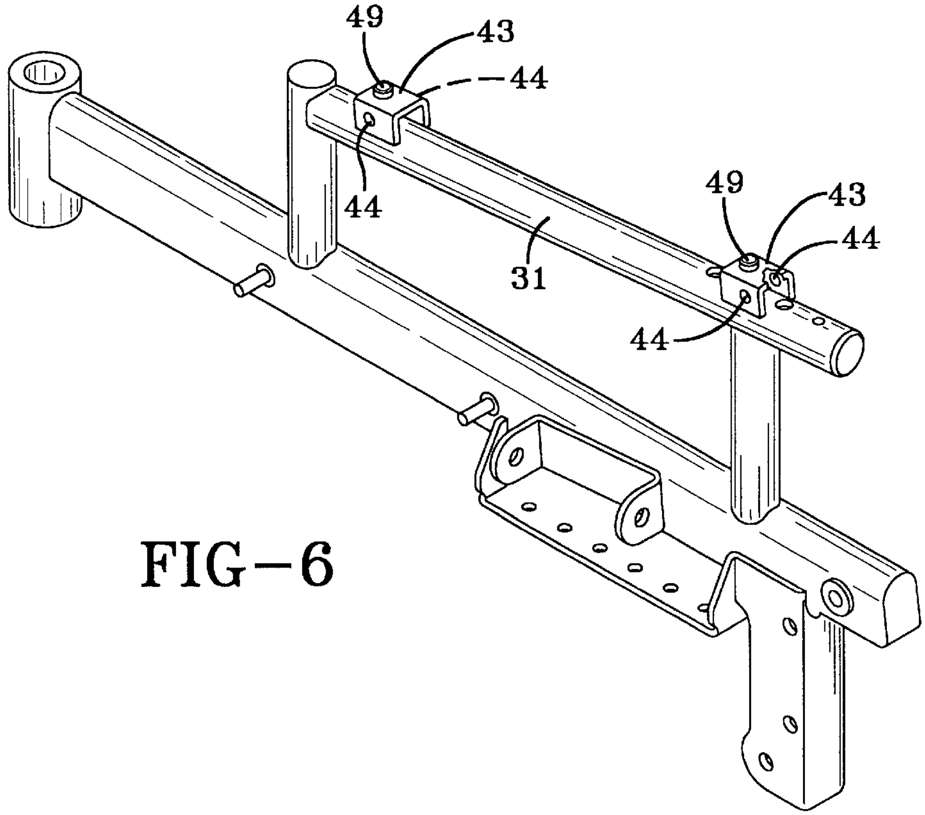
FIG. 6 is an enlarged perspective view, with a portion broken away, of one of the sideframes of the wheelchair chassis.

It can be appreciated that once van seat 21 is attached to seat frame 22 in a usual manner as illustrated in FIGS. 4 and 7, then the entire seat/seat frame assembly is removably mounted on the pair of spaced-apart sideframes 31 of chassis 23 (FIGS. 6 and 7). A pair of longitudinally spaced inverted U-shaped mounting brackets 43 is attached to each chassis sideframe 31 by welds 48. When van seat frame 22 is positioned above sideframes 31 in the manner shown in FIG. 7 by aligning each clevis assembly 40 with a respective one of U-shaped brackets 43, seat 21 then can be attached to chassis 23 as shown in FIGS. 1, 7A, 7B, and 8. More particularly, each pair of aligned openings 41, 42 formed in clevis assemblies 40A, 40B, respectively, is aligned with a respective pair of aligned circular openings 44 formed in vertical portions of each U-shaped bracket 43. A quick release pin 45 of a type well known to those skilled in the art is passed through each set of aligned pairs of openings 41, 44 and 42, 44 to secure van seat frame 22 to chassis sideframes 31. As best shown in FIGS. 7 and 7B, a plug 49 is snap fitted in an opening 53 formed in the horizontal top wall of each mounting bracket 43. Plug 49 preferably is formed of nylon, but can be formed of any other durable, low friction material such as rubber, high-density polyethylene, or the like. Plug 49 prevents clevis 40 from resting solely on pin 45 and in turn thus prevents the pin from bearing the full load of seat frame 22, van seat 21 and the occupant of the wheelchair, thereby extending the life of the pin.

Figure 8:
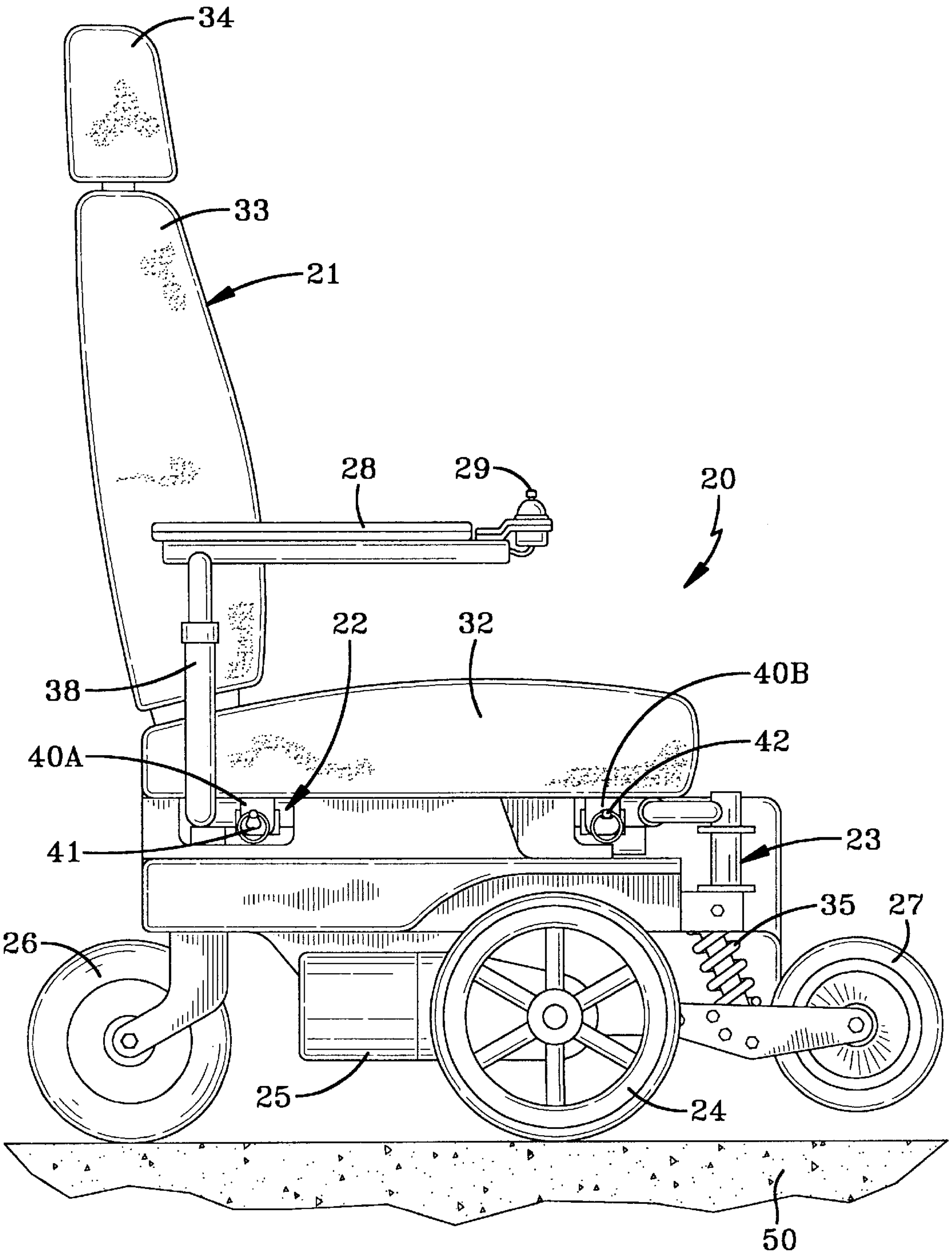
FIG. 8 is an elevational right-hand side view of the van seat and its associated seat frame mounted on the sideframes of the wheelchair chassis.

In accordance with an important feature of the present invention, pear-shaped openings 41 formed in clevis assemblies 40A allow articulation of chassis 23 and seat frame 22 relative to one another when a bump, depression or other irregularity is encountered, typically by certain ones of wheels 24, 26 of wheelchair 20. More specifically, pear-shaped openings 41, which each generally taper from a narrower width at its upper end to a wider width at its lower end, each enables its respective corner of wheelchair chassis 23 to independently move downwardly, at different times, a distance X away from seat frame 22 when bumps 52, depressions 51 or other irregularities in the wheelchair travel surface 50 are encountered, as best shown in FIGS. 9, 9A, 10, and 10A. The chassis 23 returns to its normal operating position, as best represented in FIG. 8, when the wheelchair is traveling over a relatively smooth surface.

Figure 9:
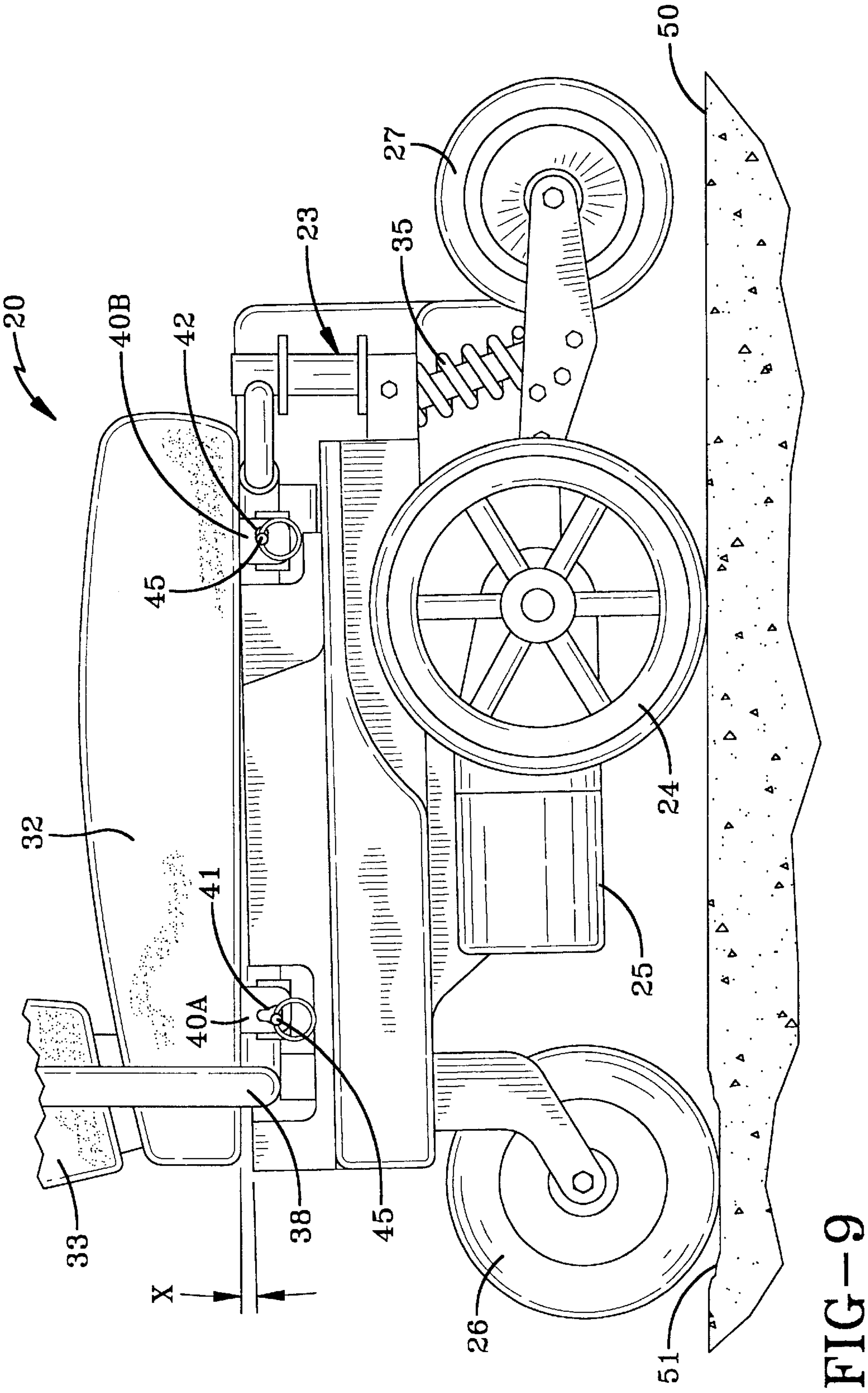
FIG. 9 is an enlarged fragmentary right-hand elevational side view showing the articulation between the chassis and van seat of the wheelchair when a depression in the travel surface of the wheelchair is encountered by one of the caster wheels.
Figure 9A:
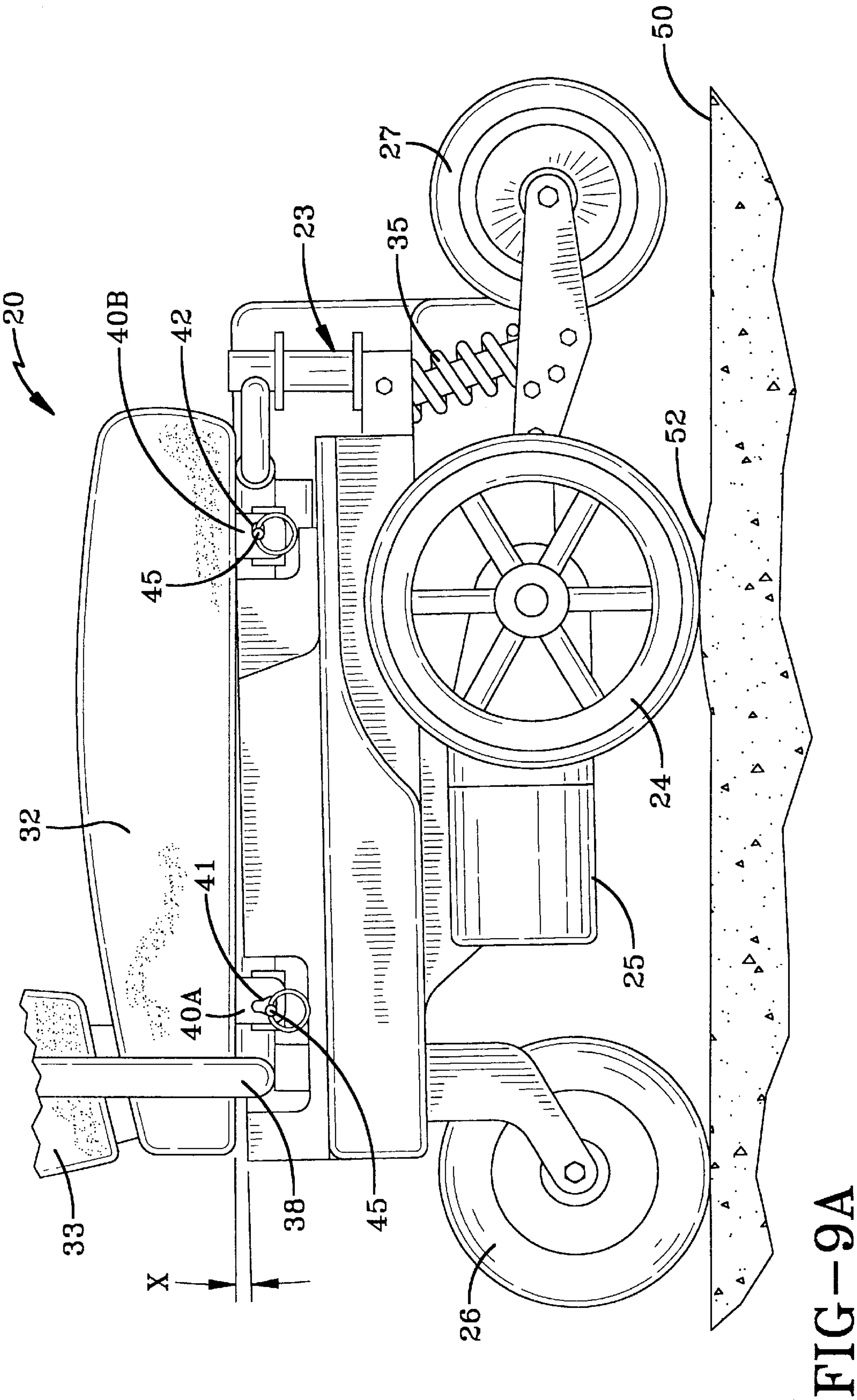
FIG. 9A is a view similar to FIG. 9, but showing the articulation between the chassis and van seat when a bump in the travel surface of the wheelchair is encountered by one of the drive wheels.
Figure 10:
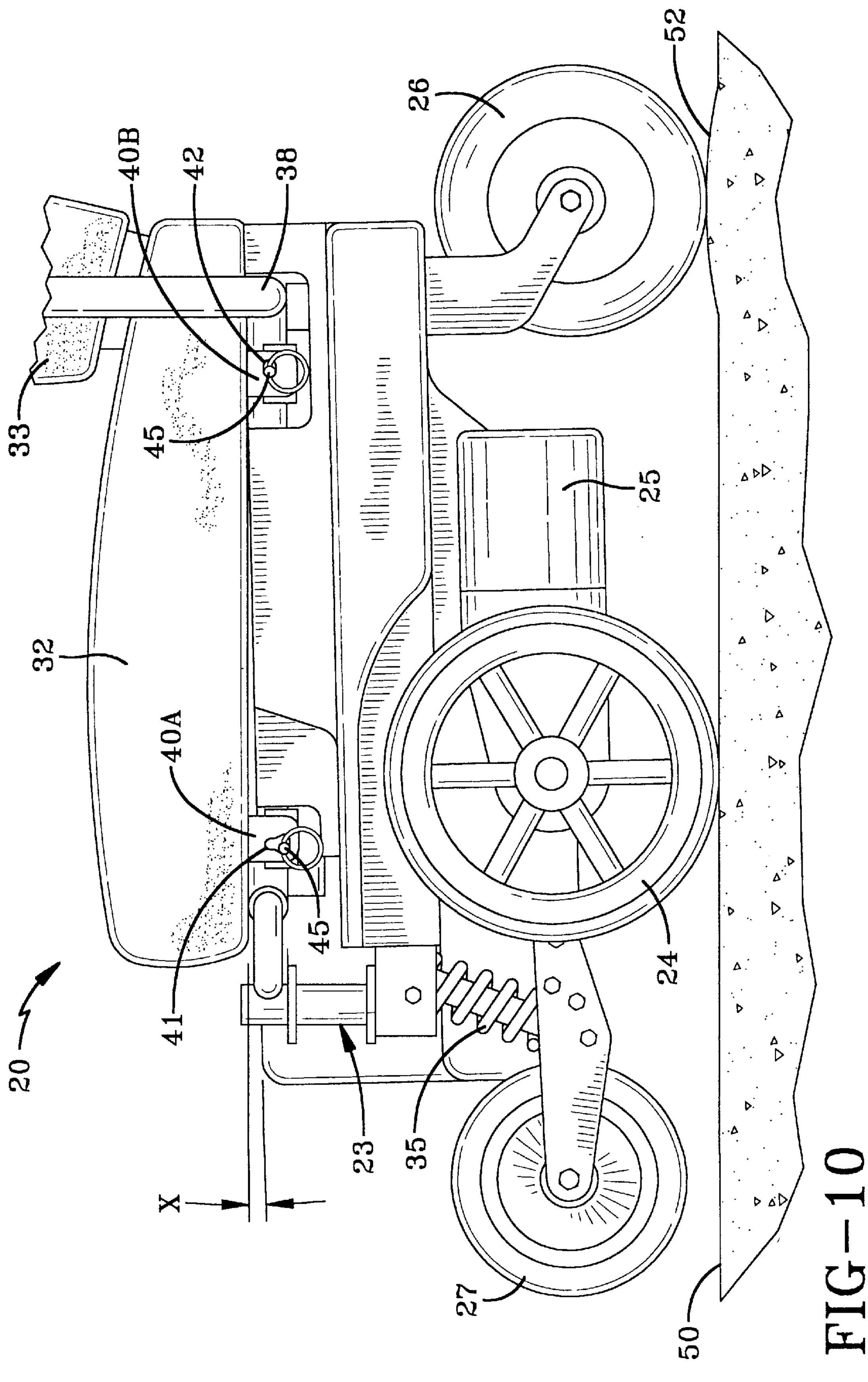
FIG. 10 is an enlarged fragmentary left-hand elevational side view showing the articulation between the chassis and van seat of the wheelchair when a bump in the travel surface of the wheelchair is encountered by one of the caster wheels.
Figure 10A:
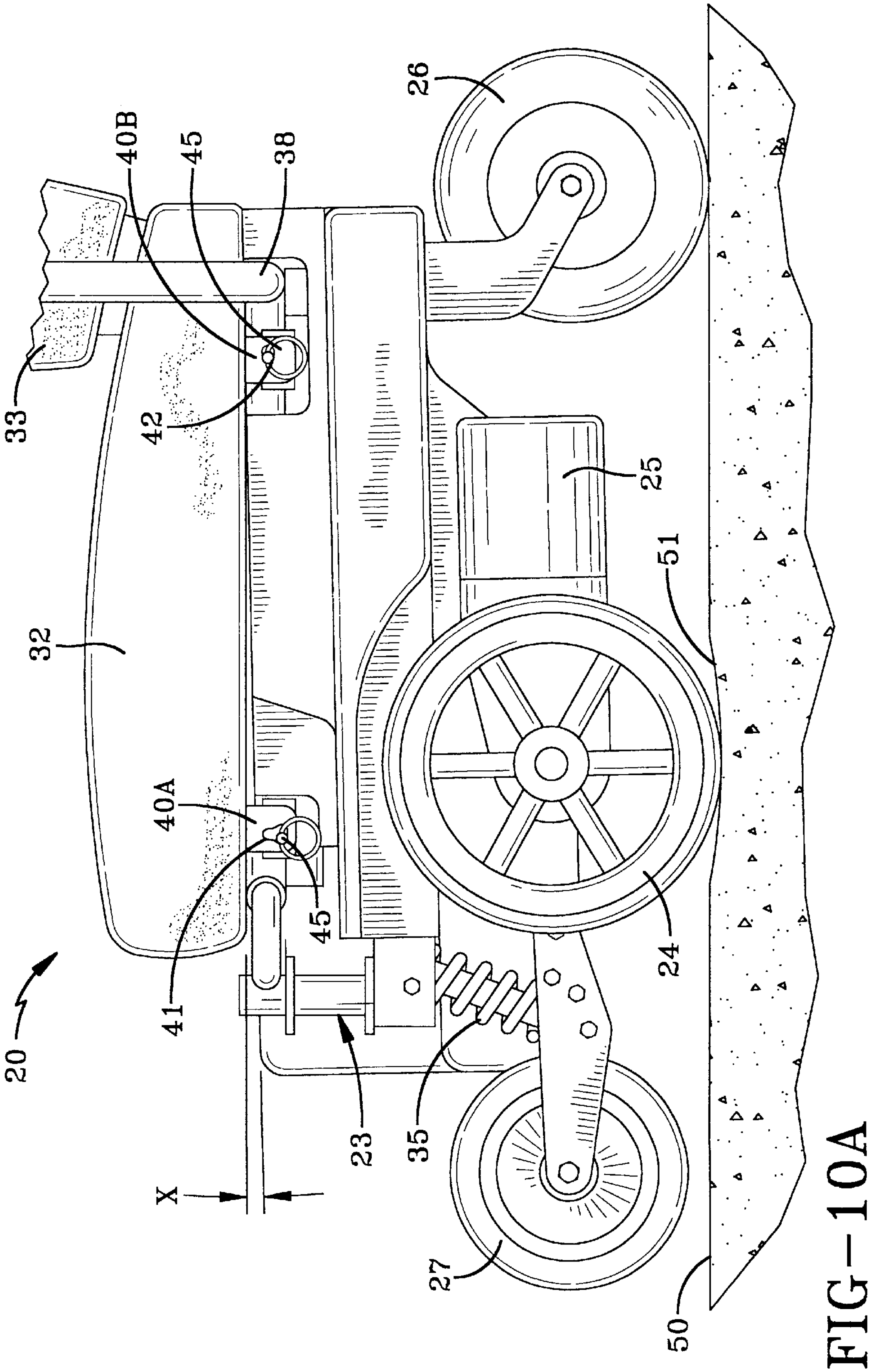
FIG. 10A is a view similar to FIG. 10, but showing the articulation between the chassis and the van seat when a depression in the travel surface of the wheelchair is encountered by one of the drive wheels.

It should be understood that the articulating seat/chassis interface for a wheelchair of the present invention only articulates under certain circumstances. More particularly, there are four instances when articulation occurs. Namely, and as best shown in FIG. 9, when the right-hand caster wheel 26 encounters a depression 51, the right rear corner of chassis 23 follows the caster wheel into the depression a distance X, and left-hand caster wheel 26 and drive wheels 24 remain in contact with travel surface 50, thereby providing the benefits of articulation. As shown in FIG. 9A, articulation also occurs when right-hand drive wheel 24 encounters a bump 52, and the right rear corner of chassis 23 again moves away from seat frame 22 a distance X. Viewing FIG. 10, when left-hand caster wheel 26 encounters a bump 52, the left front corner of chassis 23 articulates away from seat frame 22 a distance X. Finally, when left-hand drive wheel 24 encounters depression 51, the left front corner of chassis 23 again articulates away from seat frame 22 a distance X. It is understood that the above scenarios as to the four instances when articulation occurs would be different if pear-shaped openings 41 were formed in the other diagonal clevis assemblies 40B of seat frame 22.

It should also be understood that there are certain instances in which articulation cannot occur, as follows. When either one of right-hand drive wheel 24 or left-hand caster wheel 26 encounters a depression, articulation cannot occur. Also, when either one of right-hand caster wheel 26 or left-hand drive wheel 24 encounters a bump 52, articulation cannot occur. Moreover, articulation will not occur either when both drive wheels 24 encounter a bump or a depression at the same time, or similarly, when both caster wheels 26 encounter a bump or a depression at the same time. However, there may be instances in which combinations of the above scenarios enable articulation to occur. Also, distance X is limited by the height of pear-shaped openings 41, and thus articulation may fail to prevent shocks and loss of stability and control of the wheelchair if the bumps or depressions are larger than the range of articulation X of chassis 23 from seat frame 22.

Although articulation between wheelchair chassis 23 and seat frame 22 is provided by the present invention only in certain instances, an important objective of the present invention is to provide articulation at a significant cost reduction from that of a conventional suspension assembly which provides articulation in almost every instance, but at a higher cost. Providing more instances of articulation by utilizing pear-shaped openings 41 of the present invention at all four corners of seat frame 22 would create rattle and instability in the attachment of the seat frame to chassis 23. Rattle also would be a problem if only two pear-shaped openings were placed in both clevis assemblies 40 at the front of seat frame 22, or alternatively in both rear clevis assemblies of seat frame 22, or in both clevis assemblies on either the right or the left-hand side of seat frame 22.

It should also be noted, and as best shown in FIGS. 5A and 5B, that during assembly of wheelchair 20, the narrow upper portion of pear-shaped openings 41 serve as a locator for pins 45 in aligned openings 41, 42 and 44. It is understood that pins 45 can be located in the rearwardmost portion of openings 41, 42, in the central portion of the openings or in the front portion of the openings, without affecting the concept of the present invention. The wide lower portion of pear-shaped openings 41 also provides tolerance for ease of assembly and in particular during attachment of seat frame 22 to chassis side frames 31. It is further understood that openings 41 could be triangular-shaped or any other shape in which each of the openings generally taper from a narrower width at its upper end to a wider width at its lower end, again without affecting the concept of the present invention. Vertically-oriented, non-tapering openings also are contemplated by the present invention.

Thus, it can be seen that the articulating interface of seat frame 22 with chassis side frames 31 of wheelchair 20 of the present invention, and in particular clevis assemblies 40A of seat frame 22 having pear-shaped openings 41 formed therein, provides a solution in many instances to shock absorption, control and stability of wheelchairs utilizing a crossbrace-type chassis and rigid seat arrangement when a more expensive suspension assembly is undesirable. The present invention embodies a solution in a structure which is economical to manufacture and durable in use.

Accordingly, the articulating seat/chassis interface for a wheelchair of the present invention is simplified, provides an effective, safe, inexpensive, and efficient assembly which achieves all of the enumerated objectives, eliminates difficulties encountered with prior art wheelchairs, solves existing problems, and obtains new results in the art.

In the foregoing description, certain terms have been used for brevity, clarity, and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the articulating seat/chassis interface for a wheelchair is constructed, arranged, and used, the characteristics of the construction and arrangement, and the advantageous, new and useful results obtained; the new and useful structures, devices, elements, arrangements, parts, and combinations are set forth in the appended claims.

What is claimed is:

1. A wheelchair having a substantially rigid seat mountable on a substantially flexible chassis, said wheelchair including:

a) at least a pair of mounting brackets disposed on said chassis, said brackets each being formed with at least one opening; and b) at least a pair of brackets disposed on said seat, at least one of said pair of seat brackets being formed with a substantially vertically-oriented first opening, the other of said pair of seat brackets being formed with a second opening, said seat brackets each being engageable with a respective one of said chassis mounting brackets for mounting said seat on said chassis, so that upon engagement of each one of said seat brackets with a respective one of said chassis mounting brackets and alignment of the openings of said engaged brackets, a pin is insertable through the aligned openings to secure said seat to said chassis, whereby when at least a certain one of the wheels of said wheelchair engages an irregularity in a travel surface, at least one of said pins moves generally downwardly in said first opening resulting in downward articulation of said chassis relative to said seat.

2. The wheelchair of claim 1, in which said seat bracket first opening tapers from a narrower width at its upper end to a wider width at its lower end.

3. The wheelchair of claim 2, in which said seat bracket first opening is substantially pear-shaped.

4. The wheelchair of claim 1, in which said seat bracket second opening is substantially horizontally-oriented and elliptical-shaped.

5. The wheelchair of claim 1, in which said wheelchair chassis includes a pair of spaced-apart sideframes; in which said side frames each have a front end and a rear end; in which one of said mounting brackets is disposed on each of said sideframe front and rear ends; in which a substantially square-shaped seat frame is disposed on and depends from said seat; and in which one of said seat brackets is disposed adjacent to each of the four corners of said square-shaped seat frame.

6. The wheelchair of claim 5, in which at least a pair of said seat brackets each is formed with said substantially vertically-oriented first opening.

7. The wheelchair of claim 6, in which one of said pair of seat brackets formed with said vertically-oriented first opening is engageable with a selected one of said chassis sideframe front end mounting brackets, and the other one of said pair of seat brackets formed with said vertically-oriented first opening is engageable with said rear end mounting bracket of the other one of said pair of chassis side frames.

8. The wheelchair of claim 1, in which said chassis mounting brackets each is an inverted generally U-shaped bracket; and in which each vertical wall of said U-shaped bracket is formed with an opening.

9. The wheelchair of claim 8, in which each of said U-shaped bracket openings is circular-shaped.

10. The wheelchair of claim 9, in which a spacer is disposed in the top wall of said U-shaped bracket; and in which said spacer is formed of nylon.

11. The wheelchair of claim 1, in which said seat brackets each is a clevis having a pair of spaced-apart vertically-oriented walls; and in which said first opening is formed in each of said vertical walls.

12. The wheelchair of claim 1, in which said chassis is a crossbrace chassis; and in which said rigid seat is a van seat.

13. The wheelchair of claim 12, in which said crossbrace chassis is collapsible from an open operating position having said van seat mounted thereon, to a storage position after removal of said pin and said seat.

* * * * *